United States Patent [19]
// Girardin

[11] Patent Number: 4,751,362
[45] Date of Patent: Jun. 14, 1988

[54] METHOD AND APPARATUS FOR ORIENTING THE GUIDE MEMBER OF AN ELECTRODE WIRE IN A TRAVELLING WIRE EDM APPARATUS

[75] Inventor: Roger Girardin, Vernier, Switzerland

[73] Assignee: Charmilles Technologies S.A., Geneva, Switzerland

[21] Appl. No.: 863,958

[22] Filed: May 16, 1986

[30] Foreign Application Priority Data

May 17, 1985 [CH] Switzerland ............... 2122/85

[51] Int. Cl.⁴ ............................... B23H 7/10
[52] U.S. Cl. ........................ 219/69 W; 204/206
[58] Field of Search ............ 219/69 W; 204/206; 226/199

[56] References Cited

U.S. PATENT DOCUMENTS

| | | | |
|---|---|---|---|
| 3,731,045 | 5/1973 | Ullmann et al. | 219/69 W |
| 3,946,189 | 3/1976 | Pomella et al. | 219/69 W |
| 4,114,015 | 9/1978 | Vasiliev et al. | 219/69 W |
| 4,386,248 | 5/1983 | Inoue | 219/69 W |
| 4,431,896 | 2/1984 | Lodetti | 219/69 W |
| 4,485,288 | 11/1984 | Schneider | 219/69 W |
| 4,677,270 | 6/1987 | Medici et al. | 204/206 |

FOREIGN PATENT DOCUMENTS 56-39832  4/1981  Japan ............... 219/69 W

Primary Examiner—A. D. Pellinen
Assistant Examiner—Geoffrey S. Evans
Attorney, Agent, or Firm—Gifford, Groh, VanOphem, Sheridan, Sprinkle and Dolgorukov

[57] ABSTRACT

In a travelling wire EDM apparatus having orientable swivelling wire guide and support members, or wire guide heads, the orientation of each wire guide head is effected by a pair of hydraulic slave cylinders each connected to a master cylinder. Each master cylinder has an input member displaceable along one direction and the desire inclination of each wire guide head is the resultant of the composite motions of the output members of the corresponding slave cylinders.

15 Claims, 2 Drawing Sheets

METHOD AND APPARATUS FOR ORIENTING THE GUIDE MEMBER OF AN ELECTRODE WIRE IN A TRAVELLING WIRE EDM APPARATUS

BACKGROUND OF THE INVENTION

The present invention relates to travelling wire EDM apparatus in general, and more particularly to a method and mechanism for orienting the electrode wire support and guide members such as to effectuate in the workpiece a cut at an angle.

In travelling wire EDM apparatus, the electrode wire is held and guided between two guide member assemblies, one situated on one side and the other on the other side of the machining zone between the electrode wire and the workpiece. In order to effectuate in the workpiece an oblique cut, or a cut at an angle, the wire guide member assemblies, or wire guide "heads", are displaced transversely one relative to the other to cause the longitudinal axis of the wire to take a predetermined inclination which may be of several tens of degrees relative to a plane of reference. It is known that it is required to orient the machining fluid nozzle in the same direction as the wire guide heads to maintain an appropriate flow of machining fluid coaxially to the wire, and in order to avoid a machining error due to bending the wire as it exits and enters the respective guide heads.

The prior art contemplates several solutions to this problem. One solution consists in effecting a mechanical or electrical coupling between the transverse displacements of the wire guide head supports and the orientation of the wire guide heads relative to their supports (for example U.S. Pat. No. 4,431,896). The orientation of the two wire guide head supports may be synchronized by means of a pentograph (DBE No. 0084083) or by way of electric motors mounted on the wire guide head supports.

All the known solutions are complicated, and more particularly they are cumbersome which is particularly disadvantageous in view of the small room available proximate the wire guide heads.

SUMMARY OF THE INVENTION

The principal object of the present invention is to provide a mechanism for orienting the axis of travel of the electrode wire of a travelling wire EDM apparatus which accomplishes the same function as the mechanisms known in the art but with simpler and less bulky components.

The present invention accomplishes its objects and purposes by providing a hydraulic control apparatus for orienting the electrode wire guide heads and machining fluid supply nozzles.

The many objects and advantages of the present invention will become apparent to those skilled in the art when the following description of the best mode contemplated at the present for practicing the invention is read in conjunction with the accompanying drawing wherein:

DETAILED DESCRIPTION OF THE PREFERRED EMBODIMENT

Figure 1:
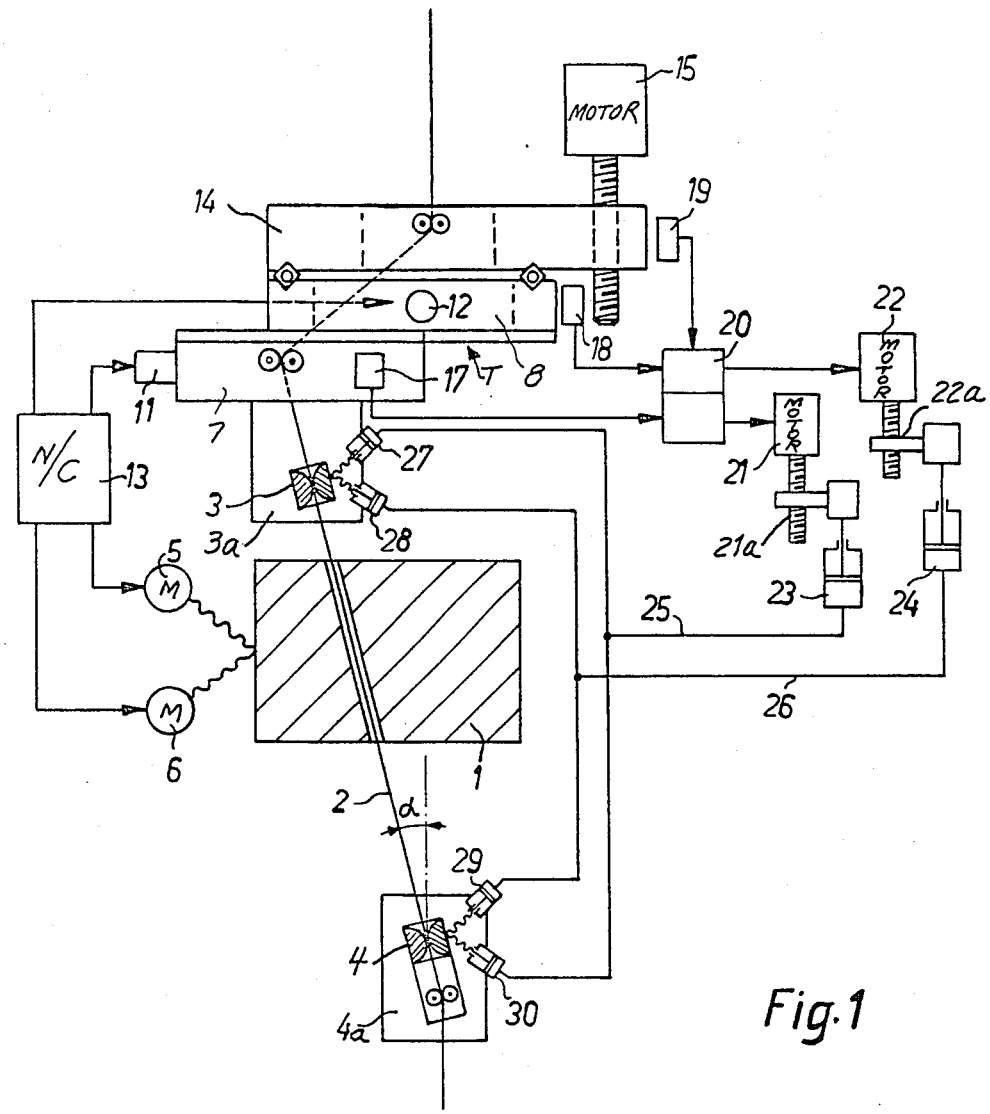
FIG. 1 illustrates schematically a travelling wire EDM apparatus incorporating a structural example of the invention.

Referring to the drawings and more specifically to FIG. 1, there is illustrated a travelling wire EDM apparatus for effecting a cut in a workpiece 1 in the machining zone formed between the workpiece 1 and the electrode wire 2 guided between an upper wire guide "head" 3 swivellably mounted in a support 3a and a lower wire guide "head" 4, swivellably mounted on a support 4a. Servo motors 5 and 6 displace the workpiece 1, by means of a cross-slide table, not shown, respectively along an X-axis and a Y-axis. In order to incline the electrode wire 2 relative to a normal plane of cut, the angle of inclination relative to such normal or reference plane of cut being designated by angle a, the support 3a, for example, of the upper wire guide head 3 is mounted on a cross-slide table T whose slides 7 and 8 are driven by servo motors 11 and 12 along two crossed axes U and V parallel to the X-axis and the Y-axis, respectively. The servo motors 11 and 12, as well as the servo motors 5 and 6, are controlled by a numerical control unit 13. The cross-slide table T is supported from and below a base 14 which is capable of being displaced vetically by a jackscrew driven by a motor 15 for adapting the distance separating the two wire guide heads 3 and 4 to the thickness of the workpiece 1.

For obtaining the parameters necessary for proper orientation of the wire guide heads, the displacements of the cross-slide table T along the axis U and V, i.e. the amount of transverse misalignment of the wire guide heads 3 and 4, one relative to the other, are monitored by a pair of position sensing transducers 17 and 18, while the vertical position of the base 14 is monitored by a position sensing transducer 19. The vertical position transducer 19 monitors the vertical distance between the two wire guide heads 3 and 4. The signals at the output of the transducers 17, 18 and 19 are applied, via appropriate correction circuits 20 adapted to modify the signals from the transducers 17 and 18 corresponding to the positions along the axes U and V as a function of the vertical distance between the wire guide heads, to two servo motors 21 and 22. The motor 21 displaces, by way of an appropriate jackscrew mechanism 21a the piston of a hydraulic cylinder sender, or master cylinder 23, while the motor 22 reciprocates by way of an appropriate jackscrew mechanism 22a the piston of a second hydraulic master cylinder 24. The orientation of the wire guide head 3 relative to its support 3a is effected by a pair of slave cylinders 27 and 28, and the orientation of the wire guide head 4 relative to its support 4a is effected by a pair of slave cylinders 29 and 30. The slave cylinders 27 and 30 are jointly connected, and thus placed in hydraulic fluid communication, with the master cylinder 23 via a conduit 25, while the slave cylinders 28 and 29 are placed in fluid communication with the master cylinder 24 via a conduit 26.

It will be appreciated that hydraulic control of the orientation of the wire guide heads can be accomplished by means other than the means hereinbefore described, for the purpose of operating the displacement command sending units. For example, the correcting circuits 20 whose function it is to determine the correct inclination of the wire independently of the vertical distance between the wire heads can be controlled directly by the signals controlling the servo motors 11 and 12. It is not necessary to control the command sending units, or master cylinders, through the intermediary of electrical signals representing the motions of the cross-slide table T, control of the command sending units being effected, for instance, by way of a mechanical coupling of variable ratio between the displacements along the U-axis and the V-axis of the cross-slide table T and the displacements of the corresponding pistons of the master cylinders.

The electrical discharge power supply, the machining fluid circulation system and the means feeding the electrode wire along its longitudinal axis are not represented at FIG. 1, as they are all well known in the art and form no part of the invention.

Figure 2:
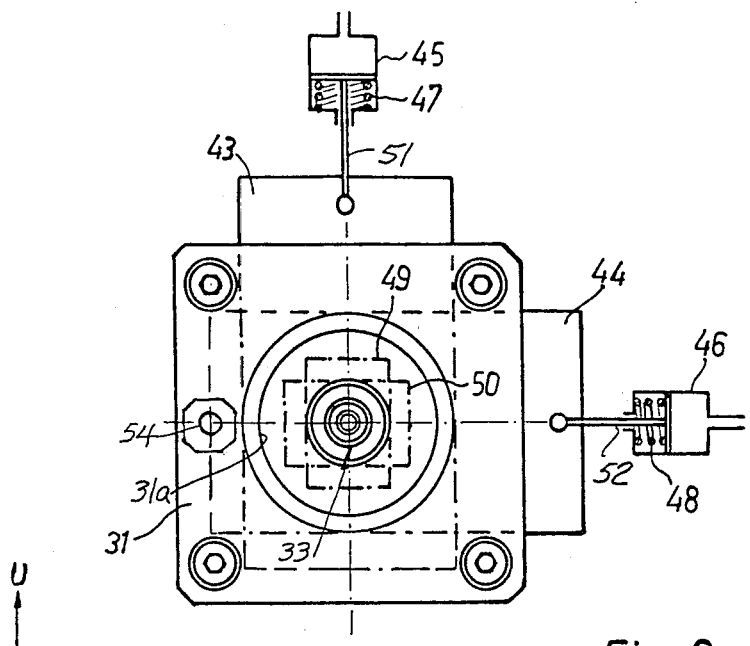
FIG. 2 is a schematic illustration, partly sectional, of an arrangement for controlling the orientation of an electrode wire guide head.
Figure 3:
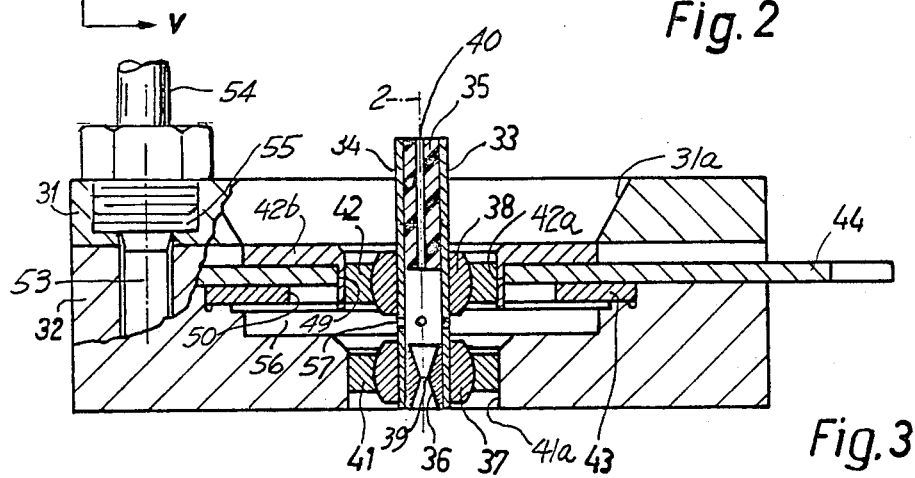
FIGS. 3 and 4 are sections through the wire guide head of FIG. 2.
Figure 4:
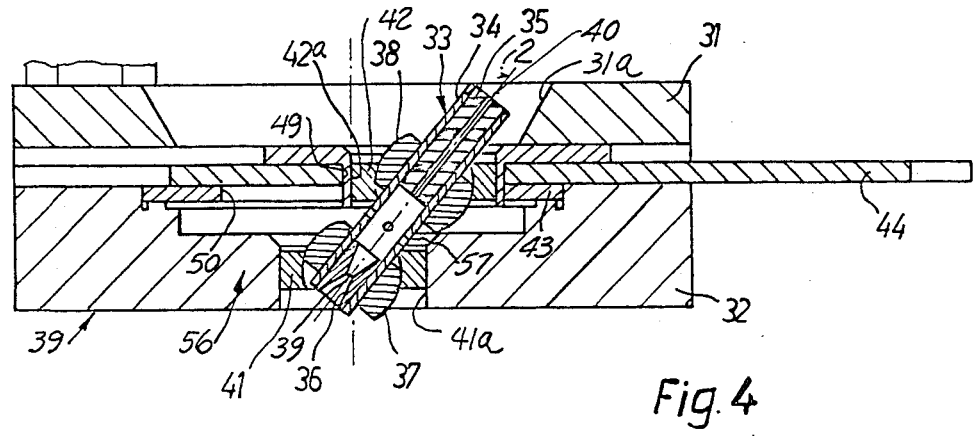

FIGS. 2-4 represent an example of structure for a wire guide assembly, or wire guide head, whose orientation is hydraulically controlled. Numeral 31 designates the cover plate of a housing 32 in which is mounted a swivelling wire guide head 33. The wire guide head 33 comprises a tubular member 34 internally lined at one end with a sleeve 35 and provided at its other end with a wire guide member 36 having a funnel-shaped inlet and an inverted funnel-shaped outlet, the narrow orifice 39 between the funnel-shaped portions acting as a centering means for the electrode wire 2, shown in phantom line, being passed through the bore 40 of the sleeve 35 in the tubular member 34. The tubular member 34 is fixedly held proximate its lower end in the bore of the ball 37 of a spherical ball and socket joint, the ball 37 being swivelledly disposed in a socket 41. The tubular member 34 is further held in the bore of a second ball 38 slidably disposed around its periphery approximately at mid-distance between the ends of the tubular member 34, the ball 38 being capable of swivelling motion relatively to a conforming socket 42. The lower socket 41 is fixedly mounted in an appropriate bore 41a through the bottom of the housing 32. The upper socket 42 is fixedly installed within the cylindrical flange 42a of a spacer plate 42b slidably disposed between the housing cover plate 31 and a pair of superimposed cross-axis slides 44 and 43 mounted in appropriate ways in the housing 32. The spacer plate cylindrical flange 42a projecs through a rectangular opening 49 in the slide 44 into a rectangular opening 50 in the slide 43, the periphery of the flange 42a having a diameter corresponding to the length of the shorter sides of the rectangular openings, and the rectangular openings being oriented as shown at FIG. 2. The slide 43 is capable of being displaced along the U axis, FIG. 2, by the output member 51 of a slave cylinder 45. The slide 44 is displaceable along the V-axis by the output member 52 of a slave cylinder 46. The axes of the rectangular openings 49 and 50, disposed at a right angle, are thus respectively along the V-axis and the U-axis. The piston of the slave cylinder 45, and consequently its output member 51 attached to the piston, is returned by a coil spring 47. In the same manner, the piston of the slave cylinder 46 and its output member 52 are returned by a coil spring 48. It will be appreciated that the structure of FIGS. 2-4 for orienting the wire guide head 33 permits to orient with precision the wire guide head 33 by pressurized hydraulic fluid supplied to the slave cylinders 45 and 46, which are the equivalent of slave cylinders 27 and 28 or 29 and 30 of FIG. 1, from the master cylinders 23 and 24. The orientation of the wire guide head 33 is the resultant of the displacements of the slave cylinder output members 51 and 52, and the positions taken by the slave cylinder output members are the analoguous of the positions of the input members of the corresponding master cylinders.

FIG. 3 illustrates the wire guide head 33 in a straight position, while FIG. 4 illustrates the same wire guide head 33 in an inclined position, a circular opening 31a in the housing cover plate 31 providing clearance for the swivelling action of the wire guide head 33.

Machining fluid is supplied to a passageway 53 in the housing 32, FIG. 3, by an appropriate conduit 54 connected to the inlet 55 of the passageway 53. The passageway 53 leads into a recess 56 formed in the housing 32 below the cross-axis slides 43 and 44 such as to supply machining fluid to the interior of the tubular member 34 of the wire guide head 33 between the end of the sleeve 35 and the wire guide member 36 through one or more ports 57 through the wall of the tubular member 34. In this manner, machining fluid can be injected into the machining zone in a jetstream concentric with the electrode wire passing through the orifice 39 in the wire guide 36 or, in the alternative and preferably, through appropriate concentric machining fluid injection nozzles, not shown, as disclosed for example in U.S. Pat. No. 4,460,816, assigned to the same assignee as the present application.

Having thus described the present invention by way of an example of structural embodiment thereof, well designed for accomplishing the objects of the invention, modifications whereof will be apparent to those skilled in the art, what is claimed as new is as follows:

1. In a travelling wire EDM apparatus wherein a cut is effected in a workpiece by means of an electrode wire constantly renewed in an electrical discharge machining zone between the electrode wire and the workpiece, a pair of support and guide means for said wire each defining a wire guide head adapted for swivelling such as to accurately support and guide said wire irrespective of inclination of said wire relative to the workpiece for effecting an oblique cut in the workpiece, the improvement comprising a pair of hydraulic master cylinders each having an input member, two pairs of slave cylinders, each pair of said two pairs of slave cylinders connected to a respective one of said pair of support and guide means, each cylinder of said each pair of slave cylinders having an output member reciprocable along a different axis, conduit means interconnecting each of said pair of master cylinders to a corresponding one of each pair of said two pairs of slave cylinders, means for displacing said input member of each of said pair of master cylinders to a predetermined position corresponding to a predetermined inclination of said wire guide head for transferring hydraulic fluid between each of said master cylinders and said corresponding one of each pair of said two slave cylinders such as to displace said output members of said two pairs of slave cylinders to positions analogous to said predetermined positions occupied by said input member of each of said pair of master cylinders, and means connecting said output of each of said slave cylinders to said wire guide head for orienting said wire guide head.

2. The improvement of claim 1 wherein said wire guide head is supported by a swivelling joint.

3. The improvement of claim 1 wherein said wire guide head is a tubular member through which said wire is passed longitudinally, said tubular member and said wire being disposed coaxially.

4. The improvement of claim 2 wherein said wire guide head is a tubular member through which said wire is passed longitudinally, said tubular member and said wire being disposed coaxially.

5. The improvement of claim 1 wherein said wire guide head is a tubular member supported by a pair of spaced apart swivelling joints each comprising a peripherally spherical member in swivelling engagement in a socket member having a corresponding spherical inner surface, one of said socket members being stationary and the other of said socket members being displaceable along a pair of axes by said output member of each of said pair of slave cylinders.

6. The improvement of claim 5 wherein said other of said socket members is mounted in a rectangular opening in each of a pair of slides, one of said slides being displaceable along one axis and the other of said slides being displaceable along the other axis, each of said slides being driven by the output member of one of said pair of slave cylinders.

7. The improvement of claim 3 further comprising machining fluid supply nozzle in said tubular member for directing a flow of machining fluid along the longitudinal axis of said wire, and means for supplying said machining fluid to said nozzle.

8. The improvement of claim 4 further comprising machining fluid supply nozzle in said tubular member for directing a flow of machining fluid along the longitudinal axis of said wire, and means for supplying said machining fluid to said nozzle.

9. The improvement of claim 5 further comprising machining fluid supply nozzle in said tubular member for directing a flow of machining fluid along the longitudinal axis of said wire, and means for supplying said machining fluid to said nozzle.

10. The improvement of claim 6 further comprising machining fluid supply nozzle in said tubular member for directing a flow of machining fluid along the longitudinal axis of said wire, and means for supplying said machining fluid to said nozzle.

11. A method for effecting a cut in a workpiece by means of an electrode wire constantly renewed in an electrical discharge machining zone between the wire and the workpiece, wherein said wire is supported and guided by a pair of support and guide means each defining a wire guide head adapted for swivelling such as to accurately support and guide and wire irrespective of inclination of said wire relative to the workpiece for effecting an oblique cut in the workpiece, said method comprising displacing an input member of each of a pair of master cylinders to predetermined positions corresponding to a desired inclination of the wire guide head, transferring hydraulic fluid between each of said master cylinders and corresponding one of a pair of slave cylinders such as to displace the output members of said slave cylinders to positions analogous to the positions occupied by the master cylinder input members, and applying the motion of the output of each of said slave cylinders to said wire guide head, whereby said wire guide head is oriented to a position being the resultant of the motions of the slave cylinder output members.

12. The method of claim 11 comprising supporting said wire guide head by a swivelling joint.

13. The method of claim 11 wherein said wire guide head is a tubular member and comprising disposing said wire coaxially in said tubular member.

14. The method of claim 13 further comprising supplying machining fluid to said tubular member for directing a flow of machining fluid along the longitudinal axis of said wire.

15. In a travelling wire EDM apparatus wherein a cut is effected in a workpiece by means of an electrode wire constantly renewed in an electrical discharge machining zone between the electrode wire and the workpiece, a pair of support and guide means for said wire each defining a wire guide head adapted for swivelling such as to accurately support and guide said wire irrespective of inclination of said wire relative to the workpiece for effecting an oblique cut in the workpiece, the improvement comprising:

means for positioning one of said pair of support and guide means, relative to an other of said pair of support and guide means to define a predetermined axis for said oblique cut, said means for positioning adapted for moving said pair of support and guide means along a pair of normal axes; a pair of master cylinders;

means for sensing the position of said means for positioning on each of said pair of normal axes and reciprocally moving said pair of master cylinders to predetermined positions;

two pair of slave cylinders, one cylinder of each of said two pair of slave cylinders communicating with a respective one of said pair of master cylinders, each pair of said two pair of slave cylinders mounted to one of said pair of support and guide means; and means for operating said pair of slave cylinders in response to said predetermined positions of said master cylinder to align said guide head to support said wire along said predetermined axis.

* * * * *